Feb. 2, 1932.  A. SCHUBERT  1,843,740
TRANSFER PRINTING PROCESS
Filed April 29, 1930
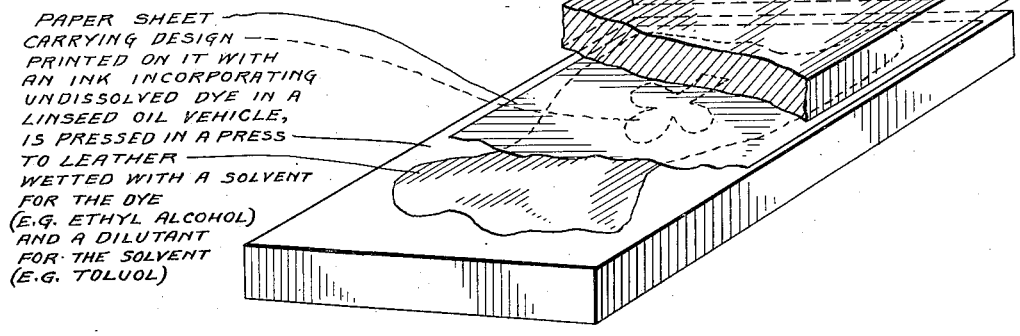
PAPER SHEET
CARRYING DESIGN
PRINTED ON IT WITH
AN INK INCORPORATING
UNDISSOLVED DYE IN A
LINSEED OIL VEHICLE,
IS PRESSED IN A PRESS
TO LEATHER
WETTED WITH A SOLVENT
FOR THE DYE
(E.G. ETHYL ALCOHOL)
AND A DILUTANT
FOR THE SOLVENT
(E.G. TOLUOL)
INVENTOR.
Adolf Schubert
BY Jeffery Kimball Eggleston
his ATTORNEYS.

Patented Feb. 2, 1932

1,843,740

UNITED STATES PATENT OFFICE

ADOLF SCHUBERT, OF MILLBURN, NEW JERSEY, ASSIGNOR TO BARRETT & COMPANY, OF NEWARK, NEW JERSEY, A CORPORATION OF NEW JERSEY

TRANSFER PRINTING PROCESS

Application filed April 29, 1930. Serial No. 448,435.

This invention relates to a transfer-printing process that I have developed for making permanent markings on fibrous articles and which is peculiarly suited for ornamentation work. The present invention concerns particularly both the relation between the dyestuff solvent and the ink-vehicle employed in this process, and the application of the process to the marking of leathers.

Hereinafter, for simplicity of expression, I shall frequently refer to ink as incorporating a single dye or other dyestuff (singular number); it will be understood however that any given ink may contain two or more dyes or other dyestuffs.

According to the usual practice of this transfer-printing process, the subject matter (letters, numerals, lines, color masses, pictures, or whatever else it may be) is printed on sheets of paper, using an ink which incorporates a dyestuff; and from these "transfer sheets", so called, the dyestuff, or a portion of it, is transferred by contact, in the presence of a solvent for the dyestuff, to the articles to be marked. As a result of this transfer of dyestuff, the desired markings are made on the article by dyeing, directly or indirectly. In this process, the solvent for the dyestuff is required to enter the vehicle part of the ink, in order that an adequate quantity of the dyestuff may be made available. As the process has been employed prior to the present invention, the materials for the dyestuffs, the dyestuff solvent, and the ink-vehicle, have been so selected with respect to each other that the dyestuff solvent is not only a solvent for the dyestuff, but is also, of and by itself, permeable into the ink-vehicle, and to the latter end, customarily, is a solvent for the ink-vehicle.

In marking leathers, according to the present invention, I employ as the dyestuff in the ink, a dye capable of dyeing the leather, and I have found it desirable, in many instances, that in addition to the solvent for the dye there be used at the time of transfer another substance or substances in considerable quantities. For example, ethyl alcohol is a desirable solvent for transferring dyes to leathers, as appears in a copending application of mine (Serial No. 448,434, filed April 29, 1930). When used with vegetable tanned leathers however, and also when used with certain of the chrome tanned leathers, it tends to extract the tannin from the leather. I have found that by materially diluting the ethyl alcohol, as it were, with a substance not having a deleterious effect on the leather, ethyl alcohol can be used for transferring to such leathers without noticeably bad results. In general, when a desirable dye solvent tends to have a deterious effect on the leather, the deleterious effect can be avoided by using therewith a sufficient quantity of another substance or substances not having a deleterious effect. The added substance may be itself a solvent for the dye, or it may be a substance in which the dye is substantially insoluble; the former is also a matter of the said copending application, and the latter is the specific form of this invention of the present application.

Further, I have discovered that it is not necessary that the dyestuff solvent, of and by itself, unaided, be permeable into the vehicle portion of the ink; but that an accompanying substance which is itself permeable into the vehicle (for example, which is a solvent for the vehicle), will serve to give a dyestuff solvent access to dyestuffs within a vehicle into which the dyestuff solvent is impermeable by itself. As before stated, the customary practice prior to the present invention was to use as the dyestuff solvent a substance which is a solvent for the chosen vehicle part of the ink also; or, conversely, to use as the ink-vehicle a substance or substances readily soluble in the chosen dyestuff solvent. In various instances it is preferable to use ink-vehicles and dyestuff solvents which are not soluble one into the other however. For example, such a practice renders it possible, particularly when the dyestuff is a dye, to obtain greater color depths or tinctorial values in some instances than has been possible heretofore. As an instance of this: Using ethyl alcohol alone as the transfer-agent, it has been found difficult to get a deep dense black from the alcohol-soluble dye nigrozine. From the results obtained with the present invention, I believe this to be due to the fact that the ink-vehicle goes so far to satisfy the solubility of the dye solvent (the alcohol) that the solvent is unable to carry over sufficient of the nigrozine to give a deep color. By using as the vehicle portion of the ink a substance or substances that is or are not soluble in the alcohol, and adding to the alcohol a substance that is a solvent for the chosen ink-vehicle, I find that it is possible to get a deep black from alcohol-soluble nigrozine, using ethyl alcohol as the dye solvent. Again, employing a substance or substances to give the dyestuff solvent access into an ink-vehicle into which it is otherwise impermeable, or into which it is insufficiently permeable, materially enlarges the range of substances from which the dyestuffs, vehicles, and dyestuff solvents can be chosen. As an instance of this: This practice adds the water-soluble dyes to the list of dyes suitable for use with my transfer-printing process. Water-soluble dyes are not well suited for my transferring process when the transfer-agent consists of the dye solvent alone, since substantially all water-soluble substances that, from the printing standpoint, are suitable for use as ink-vehicles, are also solvents of water-soluble dyes; and it is not desirable that any considerable part of the dye be dissolved in the ink-vehicle, since solution of dye in the ink-vehicle tends to produce bleeding and blurred reproduction. This difficulty can be avoided by choosing as the ink-vehicle a substance in which the water-soluble dye is insoluble, and using along with the water, at the time of transfer, a substance capable of giving the water access into this chosen ink-vehicle. As another instance: Ethyl alcohol is a desirable dye solvent when working on leathers, as before stated. The use of ethyl alcohol as the sole constituent of the transfer-agent however, has heretofore substantially limited the range of substances available for use as ink-vehicles to the non-drying oils and fats and resins. Inks employing such substances as their vehicles readily offset from one paper sheet to another as the transfer sheets are stacked one on top of another for storage and transportation. By making it unnecessary for the dye solvent to be, of and by itself, permeable into the ink-vehicle (or, conversely, by making it unnecessary for the ink-vehicle to be picked from those substances which are readily permeable by ethyl alcohol), and, instead, using with the alcohol another substance or substances to give the alcohol access into the ink-vehicle, it is possible to use other substances as the ink-vehicle, and, specifically, a relatively quick-drying vehicle; for example, an ordinary printing varnish may be used; and thus offsetting avoided, even though a substance such as ethyl alcohol is used as the dye solvent.

According to the present invention therefore, I employ at the time of making the transfer, at least two substances, rather than one, and both in appreciable quantities. Of the multiple substances, one or more is a solvent for the dyestuff employed in the ink; another or others will be chosen for its or their ability to perform another or other necessary or desirable functions. It will be understood however that the functions performed by these various substances may overlap in some instances. It is not for example altogether an essential feature of the invention that the dyestuff solvent be entirely impermeable into the vehicle, or that the substance or substances used with the dyestuff solvent be entirely non-solvents for the dyestuffs; the dyestuff solvent or solvents itself or themselves may be more or less permeable into the vehicle, and the added substance or substances may be more or less a solvent for the dyestuff; in some instances indeed it may be desirable that either of these or both be the fact. Ordinarily however I contemplate that the various functions will be substantially segregated to the various substances respectively chosen to perform them. These various substances composing the transfer-agent of the present invention may be applied separately where necessary or desirable. Or they may be mixed together and applied as a unit, say in the manner that the single-substance transfer-agent has been applied heretofore. Where the substances, or some of them, are non-miscible, a further substance may be added to cause them to mix, say in the form of an emulsion.

Obviously all the various advantages flowing from my present invention may not be achieved simultaneously in certain instances. On the other hand, in other instances a proper selection of substances may combine substantially all of them. Obviously therefore I contemplate that various substances may be used along with the solvent for the dyestuff, depending on the conditions encountered and the results to be accomplished. For general use under present conditions, to secure all the possible results of the invention named above, toluol is suitable. Toluol is a solvent for ordinary printing ink varnish, and hence permits the use of this material as the vehicle part of the ink, when the dyestuff solvent is a substance in which the varnish is insoluble; in general, it permits the use of quick drying vehicles. It seems to have no deleterious effect on any of the ordinary leathers, and hence, furthermore, is peculiarly suited for work on leathers where the dyestuff is preferably an alcohol-soluble dye and ethyl alcohol is the dye solvent employed at the time of transfer. In such situations it may be used to increase a tinctorial value, or to avoid a deleterious effect of the alcohol as a transfer-agent. Xylol and benzol are equivalents of toluol in their actions; I prefer substances of this class.

In carrying out my process as it includes my present invention therefore: An ink is first made of a mixture of a dyestuff and an ink-vehicle chosen as suiting the conditions under which the subject matter is formed therefrom, e. g. as suiting the particular printing process selected for printing the transfer sheets. Where the transfer is to be made to leather, I contemplate that the dyestuff will be a dye capable of directly dyeing the leather, and preferably, usually, an alcohol-soluble dye. For printing the subject matter (letters, numerals, lines, color masses, pictures, etc. etc.) on a quantity of sheets of paper, cloth, or the like, the vehicle material is so chosen that the ink resulting from the mixture has that viscosity, tacky or greasy nature, or whatever other characteristics are required of the ink used in the particular printing process employed for laying down the ink on the paper or cloth. It may also be chosen for its quick-drying qualities. Furthermore, the vehicle is chosen from a substance or substances that will remain on these printed transfer sheets until the transfers are made to the leather, since I believe that the presence of the vehicle at the time of the transfer helps to confine the dyestuff to its intended boundaries, i. e., restrains bleeding or blurring. The dyestuff is not to be held in the vehicle in solution however, but in a solid state; in suspension as it were. If the dyestuff is soluble in the vehicle, bleeding may take place in the transfer sheet and this result in blurred outlines and poor color gradations in the reproductions on the leather, as before noted. Furthermore, for certain colors at least, I have seemed to find it impossible to get sufficient dye into the vehicle in dissolved form to give the desired color intensity or tinctorial value. Hence I choose for the vehicle (including in that term everything in the ink excepting the dyestuff), a substance or substances in which the dyestuff is substantially insoluble. Of course, the dyestuff may be introduced into the vehicle initially in the form of a solution, if desired, providing the solvent is evaporated for example, or if in any other manner the proper relatively-large ratio of dyestuff to vehicle is produced prior to the printing on the transfer sheet base and insufficient of the dyestuff remains dissolved in the vehicle to produce noticeable bleeding, blurred outlines and poor color gradations. Preferably therefore I employ for the vehicle a material in which the chosen dyestuff is substantially insoluble, and I grind the dyestuff in powdered form into the vehicle. Afterwards the mixture can be thickened if too thin and thinned if too thick, by the addition of suitable inert substances as will be understood; also drying retardants and/or other useful substances may be incorporated in and made part of the ink as will be understood. Finally, and particularly where the dyestuff is a dye, the ink-vehicle is selected by preference from those substances which are insoluble, or substantially insoluble, in the solvent for the dye that is to be used in making the transfer. Ordinary printing ink varnish, i. e. an inch vehicle consisting of linseed oil prepared in ordinary manners, satisfies the conditions, and by preference is chosen.

Usually I print up a quantity of these transfer sheets at a time, using sheets of paper, cloth, or other relatively light, thin, flexible material. I prefer a fibrous material for these transfer sheet bases, because of the permeability of fibrous materials. Newsprint paper is suitable and usually give better results than a heavily sized paper. The stock of transfer sheets can be stored, and used as needed, so long as the vehicle remains on the transfer sheet and remains permeable to the vehicle-permeant which is used when making the transfer to the leather.

To make a transfer from such a transfer sheet, I press the sheet smoothly to the article or material to be marked, inked face to the same, in the presence of substance or substances which is or are a solvent or solvents for the dyestuff in the ink and capable of carrying dyestuff into the midst of the fibers of the article or material. And I also have present, or I have previously applied, that substance or substances the addition of which is a subject of the present invention. Where the dyestuff appears in the ink as a compound which must be broken up before it can act on the fibers (for example where a dye is in the form of a lake) the dyestuff solvent can be chosen for its ability to break up the compound, as well as for its ability to dissolve the essential element to be transferred; or a substance accompanying the dyestuff solvent can be employed to break up the compound. The dyestuff solvent need not then be a solvent for the dye-compound found in the ink; it need be a solvent for only the dye proper, or an essential principle. The substance or substances, the addition of which to the dyestuff solvent is a subject of the present invention, will be chosen of course with reference to the function or functions they are to perform. Assuming, for example, that simply a deleterious effect of a chosen dye solvent is to be avoided, the added substance may be selected solely for its ability to perform this function, as a dilutant of the solvent as it were. Again, assuming that the substance chosen for the vehicle part of the ink is one that is not permeable by the dyestuff solvent alone, of and by itself, the added substance, or one or more of them, will be chosen for its ability to give the chosen dyestuff solvent access into the ink-vehicle. As such vehicle-permeants I customarily employ solvents for the vehicles. Preferably also both the dyestuff solvent and the added substance or substances are chosen from those substances in which the dye is or becomes relatively insoluble as the dye comes into dyeing relation to the fibers to be marked and becomes fixed thereto. Finally all of these substances employed at the time of transfer to the leather, are chosen from substances that do not deleteriously attack or modify the article or material to be marked, unless contrary precautions are taken. As before indicated, I usually mix the dyestuff solvent or solvents and the added substance or substances together and apply them as a unit, with or without the addition of another substance to render them miscible. Usually I apply the mixture to the article or material to be marked, either by spraying or dipping, immediately before the transfer, and apply the transfer sheet dry to the wet article. I regard it as highly desirable to apply at least the dyestuff solvent to the article or material to be marked. Conceivably the added substance or substances (or indeed the mixture) may be applied to the transfer sheet; as a particular instance, it may be well to apply a vehicle-permeant to the transfer sheet in some cases, in order to give the chosen permeant an opportunity to act on the vehicle before the solvent is applied. Usually too I apply pressure, squeezing the transfer sheet to the article in a press with considerable pressure; I have used up to 300 pounds per square inch. This is not to be understood to indicate however that such high pressures as this are always necessary. Heat also can be used simultaneously with the pressure, as by passing steam through pipes provided in the plates of the press; heat is not altogether essential however. The transfer of dyestuff takes place rather quickly, at least under high pressure, a transfer being produced from a fraction of a minute to two minutes. However the length of time the transfer sheet is left in contact with the leather is not critical; that is to say, without heat at least, lengthening the period of contact somewhat beyond the period actually necessary to produce a transfer of full quantity, does not produce noticable bleeding or blurring, other conditions being proper. When a transfer has been accomplished, the paper or cloth is peeled off the article of course. Preferably the substances I employ when making the transfer are also volatile, so that they readily escape or are removed from the article by evaporation after they have performed their functions.

It will be apparent from the foregoing, that from a broad point of view, the exact nature of the "dyestuff" employed in the ink is not material to my present invention, excepting only that it be a substance that is capable of dyeing or producing dyeing of the article as the term "dyeing" is used in the dyeing art, and not a mere staining, or a mere fixing of pigment to the article by the ink-vehicle after the manner of printing. The various forms which a "dye" may assume will be understood by those skilled in textile printing. The essential dyeing principle may stand alone in the ink, uncompounded. Lakes have been mentioned before. For developed colors and other dyes acting in analogous ways, all the constituents may be incorporated in the ink when conditions are suitable; or in the alternative, the ink may include only a part of the constituents of the dye and when necessary the remainder may be applied to the article direct, either before or after the transferring operation. The article may be treated in various manners either before or after the transferring is done to it, or both before and after; for example, to "prepare" the article, for cleaning, to brighten the colors, etc. etc. The drawing shows a diagrammatic representation of the process, with self explanatory legends.

As specific examples of my present invention: To dye a vegetable tanned leather with a deep black, an alcohol-soluble nigrozine, in finely powdered form, is ground into an ordinary printing ink varnish consisting of prepared pure linseed oil, and the mixture then thickened or thinned to such a consistency that the resulting dye-vehicle mixture has that consistency required for the operation chosen for printing the transfer sheets. The ratio of nigrozine to vehicle (varnish) is found by trial, that ratio being used which gives the desired color strength or tinctorial value in the reproduction on the leather. With the ink thus formed the design or ornamental matter is printed on sheets of such paper as is used for newsprint, using type, or blocks or rolls etched or engraved in accordance with the desired design. Because of the nature of this vehicle, the ink hardens promptly after printing, and hence the care ordinarily given by printers is sufficient to prevent off-setting from sheet to sheet as a stock of the transfer sheets are stacked one on another. When the time has come to make a transfer to a skin or piece of the leather, the latter is sprayed with or dipped into a mixture of about forty parts of ethyl alcohol and sixty parts of toluol and immediately thereafter one of the transfer sheets is laid on the skin or leather, inked face to the latter, and the two pressed momentarily in a press. A soft pad, say of felt, may be interposed between the two and one plate or roll of the press, and considerable pressure used to evenly and uniformly contact the transfer sheet with the leather throughout the whole surface of the latter. One or both plates or rolls of the press may be heated by steam. The printing ink varnish being readily soluble in toluol, the alcohol is given immediate access to the nigrozine, dissolves more or less of the nigrozine, and in solution the nigrozine passes through the alcohol into the midst of the fibers of the wetted leather, whence it dyes the leather in accordance with the design laid down on the paper in the printing of the latter. After momentary pressing the two are taken from the press and the paper sheet peeled off.

As an alternative, a water-soluble nigrozine may be used in printing ink varnish. The transfer-agent with which the leather is sprayed or into which the leather is dipped immediately before transferring, may then be a mixture of about equal parts of water and toluol to which is added a relatively small amount of triethanolamine oleate to cause the water and toluol to mix, forming an emulsion, the two alone being non-miscible. With this transfer-agent the process is carried out in detail as before described.

It will be understood that my invention is not limited to the details of the foregoing description, except as appears hereafter in the claims.

I claim:

1. In the method of making markings on leather which consists in printing the subject matter on transfer sheet bases with an ink incorporating a dye for the leather and vehicle material suiting the ink to the particular printing process by which the printing on to the transfer sheet bases is done, substantially all the dye existing in the ink in an undissolved state, and pressing, while the ink-vehicle is still present on the transfer sheet, a transfer sheet to the leather in the presence of a solvent for the dye capable of carrying dye from the ink-vehicle into dyeing relation to the fibers of the leather, the improvement, where the dye solvent tends to have a deleterious effect on the leather, which consists in having present also, when the transfer sheet is pressed to the leather, a diluent for the dye solvent, which diluent has substantially no deleterious effect on the leather.

2. In the method of making markings on leather which consists in printing the subject matter on transfer sheet bases with an ink incorporating a dye for the leather and vehicle material suiting the ink to the particular printing process by which the printing on to the transfer sheet bases is done, substantially all the dye existing in the ink in an undissolved state, and pressing, while the ink-vehicle is still present on the transfer sheet, a transfer sheet to the leather in the presence of a solvent for the dye capable of carrying dye from the ink-vehicle into dyeing relation to the fibers of the leather, the improvement, where the dye solvent tends to have a deleterious effect on the leather, which consists in having present also, when the transfer sheet is pressed to the leather, a diluent for the dye solvent, in which diluent the dye is substantially insoluble and which diluent has substantially no deleterious effect on the leather.

3. In the method of making markings on leather which consists in printing the subject matter on transfer sheet bases with an ink incorporating a dye for the leather and vehicle material suiting the ink to the particular printing process by which the printing on to the transfer sheet bases is done, substantially all the dye existing in the ink in an undissolved state, and pressing, while the ink-vehicle is still present on the transfer sheet, a transfer sheet to the leather in the presence of a solvent for the dye capable of carrying dye from the ink-vehicle into dyeing relation to the fibers of the leather, the improvement, where the dye solvent tends to have a deleterious effect on the leather, which consists in having present also, when the transfer sheet is pressed to the leather, toluol.

4. The method of making markings on leather that is deleteriously affected by alcohol, which consists in printing the subject matter on transfer sheet bases with an ink incorporating an alcohol soluble dye capable of dyeing the leather and vehicle material suiting the ink to the particular printing process by which the printing on to the transfer sheet bases is done, substantially all the dye existing in the ink in an undissolved state, and pressing, while the ink-vehicle is still present on the transfer sheet, a transfer sheet to the leather in the presence of an alcohol and toluol.

5. The method of making markings on fibrous articles which consists in printing the subject matter on transfer sheet bases with an ink incorporating a dye for the article and vehicle material suiting the ink to the particular printing process by which the printing on to the transfer sheet bases is done, said dye being substantially insoluble in said vehicle material and said vehicle material being substantially impermeable by the dye solvent hereinafter mentioned, pressing, while the ink-vehicle is still present on the transfer sheet, a transfer sheet to an article to be marked in the presence of a solvent for the dye capable of carrying dye from the ink-vehicle into dyeing relation to the fibers of the article, and subjecting, about the time the transfer sheet is pressed to the article, the ink-vehicle to a substance capable of causing the ink-vehicle to admit the said dye solvent.

6. The method of making markings on fibrous articles, which consists in printing the subject matter on transfer sheet bases with an ink incorporating a dye for the article and vehicle material suiting the ink to the particular printing process by which the printing on to the transfer sheet bases is done, said dye being substantially insoluble in said vehicle material and said vehicle material being substantially impermeable by the dye solvent hereinafter mentioned, pressing, while the ink-vehicle is still present on the transfer sheet, a transfer sheet to an article to be marked in the presence of a solvent for the dye capable of carrying dye from the ink-vehicle into dyeing relation to the fibers of the article, and in the presence of another substance which is a solvent for the ink-vehicle.

7. The method of making markings on fibrous articles, which consists in producing the subject matter in an ink incorporating a dyestuff for the article and a vehicle material suiting the ink to the particular process by which the subject matter is produced and which is substantially impermeable by the solvent for the dyestuff hereinafter mentioned, substantially all of said dyestuff existing in the vehicle material in an undissolved state, and pressing the subject matter to the article in the presence of a solvent for the dyestuff capable of carrying dyestuff from the ink-vehicle into dyeing relation to the fibers of the article, and in the presence of a substance giving said dyestuff solvent access to the dyestuff within said vehicle.

8. The method of making markings on fibrous articles, which consists in producing the subject matter in an ink incorporating a dyestuff for the article and a vehicle material suiting the ink to the particular process by which the subject matter is produced and which is substantially insoluble in the solvent for the dyestuff hereafter mentioned, substantially all of said dyestuff existing in the vehicle material in an undissolved state, and pressing the subject matter to the article in the presence of a solvent for the dyestuff capable of carrying dyestuff from the ink-vehicle into dyeing relation to the fibers of the article, and in the presence of another substance which is a solvent for the ink-vehicle.

9. The method of making markings on fibrous articles, which consists in printing the subject matter on transfer sheet bases with an ink incorporating a dye-stuff for the articles and vehicle material suiting the ink to the particular printing process by which the printing on to the transfer sheet bases is done and which is soluble in toluol, substantially all of the dyestuff existing in the ink in an undissolved state, applying toluol, and pressing, while the ink-vehicle is still present on the transfer sheet, a transfer sheet to an article in the presence of a solvent for the dyestuff capable of carrying dyestuff from the ink-vehicle into dyeing relation to the fibers of the articles.

10. In the method of making markings on fibrous articles, which consists in printing the subject matter on transfer sheet bases with an ink incorporating a dyestuff for the articles and printing ink varnish, substantially all the dyestuff existing in the ink in an undissolved state, and pressing, while the varnish is still present on the transfer sheet, a transfer sheet to an article in the presence of a solvent for the dyestuff capable of carrying dyestuff from the ink-vehicle into dyeing relation to the fibers of the article, and in the presence of toluol.

11. The method of making markings on fibrous articles, which consists in printing the subject matter on transfer sheet bases with an ink incorporating a dyestuff for the articles and vehicle material suiting the ink to the particular printing process by which the printing on to the transfer sheet bases is done, said dyestuff being substantially insoluble in said vehicle material and said vehicle material being substantially insoluble in the solvent for the dyestuff hereinafter mentioned, mixing together a solvent for the dyestuff capable of carrying dyestuff from the ink-vehicle into dyeing relation to the fibers of the article and another substance capable of causing the ink-vehicle to admit said dyestuff solvent, applying said mixture to the article, and pressing, while the ink-vehicle is still present on the transfer sheet, a transfer sheet to the article while the article is still wet with said mixture.

12. The method of making markings on fibrous articles, which consists in printing the subject matter on transfer sheet bases with an ink incorporating a dyestuff for the articles and vehicle material suiting the ink to the particular printing process by which the printing on to the transfer sheet bases is done, said dyestuff being substantially insoluble in said vehicle material and said vehicle material being substantially insoluble in the solvent for the dyestuff hereinafter mentioned, mixing together a solvent for the dyestuff capable of carrying dyestuff from the ink-vehicle into dyeing relation to the fibers of the article, another substance capable of causing the ink-vehicle to admit said dyestuff solvent and with which said dyestuff solvent is immiscible, and a substance rendering the foregoing miscible, and pressing, while the ink-vehicle is still present on the transfer sheet, a transfer sheet to the article in the presence of said mixture.

13. The method of making markings on leather which consists in printing the subject matter on transfer sheet bases with an ink incorporating an alcohol-soluble dye for the leather and vehicle material suiting the ink to the particular printing process by which the printing on to the transfer sheet bases is done, in which vehicle material the dye is substantially insoluble, and which vehicle material is substantially impermeable by alcohol, and pressing, while the ink-vehicle is still present on the transfer sheet, a transfer sheet to the leather in the presence of alcohol, and in the presence of a substance that is permeable into the ink-vehicle.

14. The method of making markings on leather which consists in printing the subject matter on transfer sheet bases with an ink incorporating an alcohol-soluble dye for the leather and vehicle material suiting the ink to the particular printing process by which the printing on to the transfer sheet bases is done, in which vehicle material the dye is substantially insoluble, and which vehicle material is substantially impermeable by alcohol, and pressing, while the ink-vehicle is still present on the transfer sheet, a transfer sheet to the leather in the presence of alcohol and toluol.

15. The method of making markings on leather which consists in printing the subject matter on transfer sheet bases with an ink incorporating an alcohol-soluble dye for the leather and printing ink varnish, pressing, while the ink-vehicle is still present on the transfer sheet, a transfer sheet to the leather in the presence of alcohol, and treating, at about the time the transfer sheet is pressed to the leather, the ink-vehicle with toluol.

16. The method of making markings on leather which consists in printing the subject matter on transfer sheet bases with an ink incorporating an alcohol-soluble dye for the leather and vehicle material suiting the ink to the particular printing process by which the printing on to the transfer sheet bases is done, said dye being substantially insoluble in said vehicle material and said vehicle material being substantially insoluble in the alcohol hereinafter mentioned, and pressing, while the ink-vehicle is still present on the transfer sheet, a transfer sheet to the leather in the presence of ethyl alcohol, and in the presence of toluol.

In testimony whereof, I have signed this specification.

ADOLF SCHUBERT.